United States Patent
Coonrad

(10) Patent No.: US 6,799,359 B2
(45) Date of Patent: Oct. 5, 2004

(54) STRONGBACK SYSTEM FOR JOINING A HANDLE TO A HAMMER HEAD

(75) Inventor: Todd Douglas Coonrad, Santa Cruz, CA (US)

(73) Assignee: Douglas Tool, Inc., Santa Cruz, CA (US)

( * ) Notice: Subject to any disclaimer, the term of this patent is extended or adjusted under 35 U.S.C. 154(b) by 103 days.

(21) Appl. No.: 10/318,611

(22) Filed: Dec. 13, 2002

(65) Prior Publication Data

US 2003/0088964 A1 May 15, 2003

Related U.S. Application Data

(62) Division of application No. 09/544,838, filed on Apr. 6, 2000, now Pat. No. 6,494,119.

(51) Int. Cl.[7] .............................................. B21D 39/00
(52) U.S. Cl. .................................... 29/522.1; 29/525.03
(58) Field of Search ....................... 29/509, 513, 522.1, 29/525.02, 525.03; 81/20; 403/248

(56) References Cited

U.S. PATENT DOCUMENTS

| | | | | |
|---|---|---|---|---|
| 341,474 A | * | 5/1886 | Grellner | 403/249 |
| 378,650 A | * | 2/1888 | Bigelow | 81/20 |
| 898,950 A | * | 9/1908 | Wyatt | 403/248 |
| 964,976 A | * | 7/1910 | Kukuruda | 403/250 |
| 5,896,788 A | * | 4/1999 | Hreha et al. | 81/20 |

* cited by examiner

*Primary Examiner*—David P. Bryant
(74) *Attorney, Agent, or Firm*—Donald R. Boys; Central Coast Patent Agency, Inc.

(57) ABSTRACT

A striking tool having a handle engaged in an eye in a head uses a metal strongback unit engaged in a slot the handle to secure the handle in the eye of the head. The metal strongback unit has openings in a web that fits in the slot in the handle that allow wedges to be driven into the handle in a manner that both the handle end and the web of the strongback unit are spread. Metal of the strongback unit urges against an inside surface of the head in the eye to form a secure fit. In a preferred embodiment the strongback unit has metal sides that may extend below the head and provide metal surfaces for overstrike protection.

10 Claims, 17 Drawing Sheets

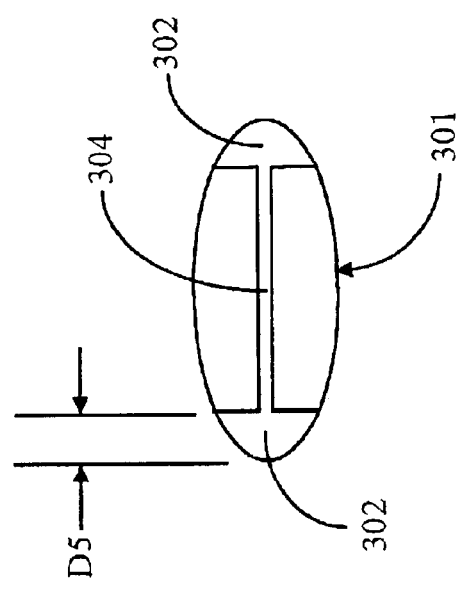
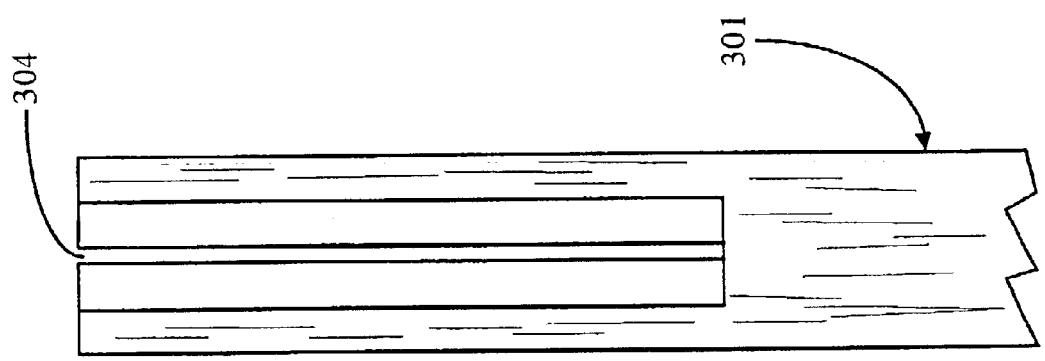

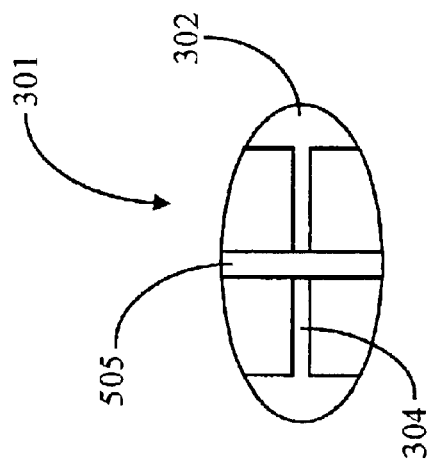
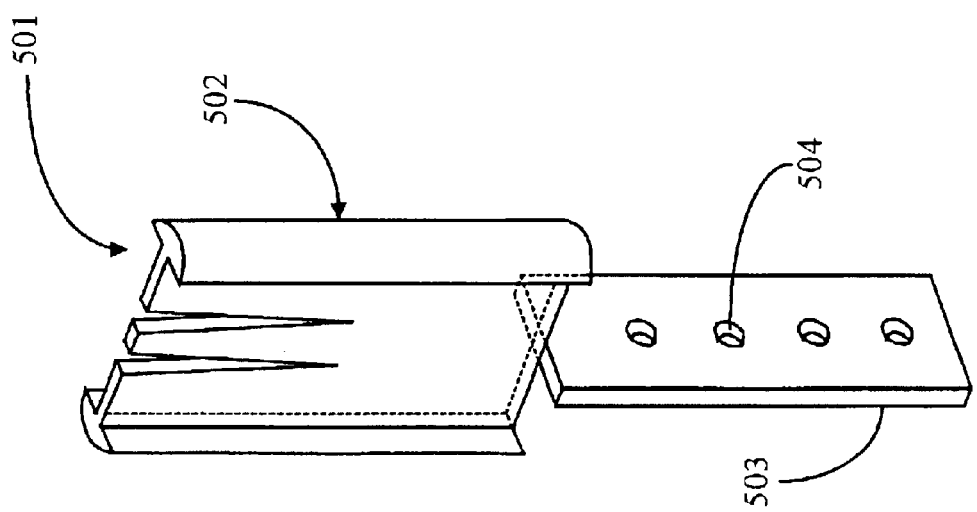

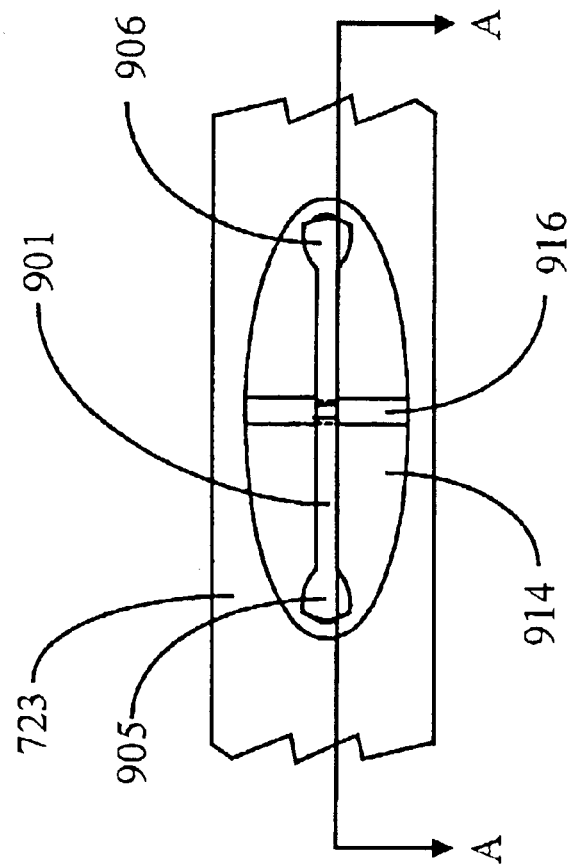
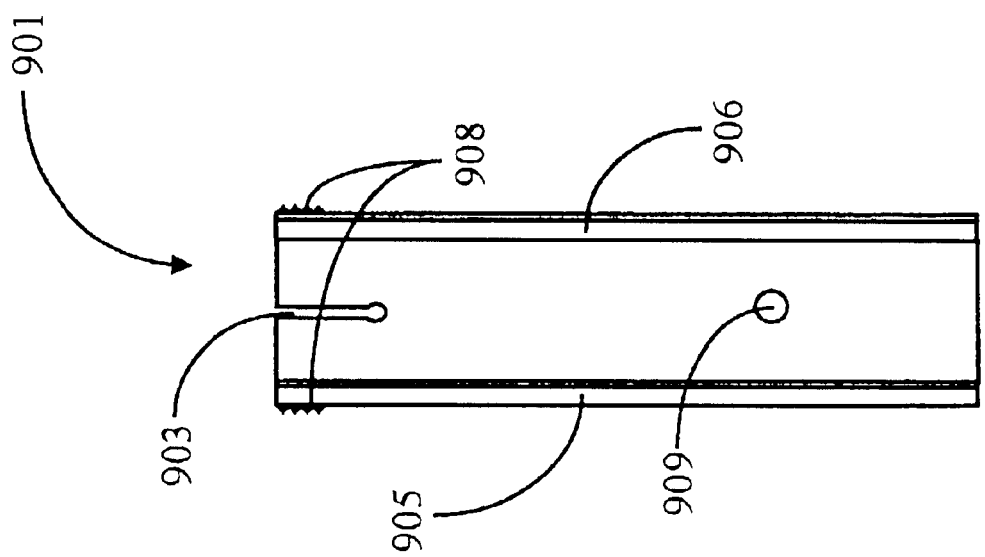
Fig. 9b
Fig. 9a

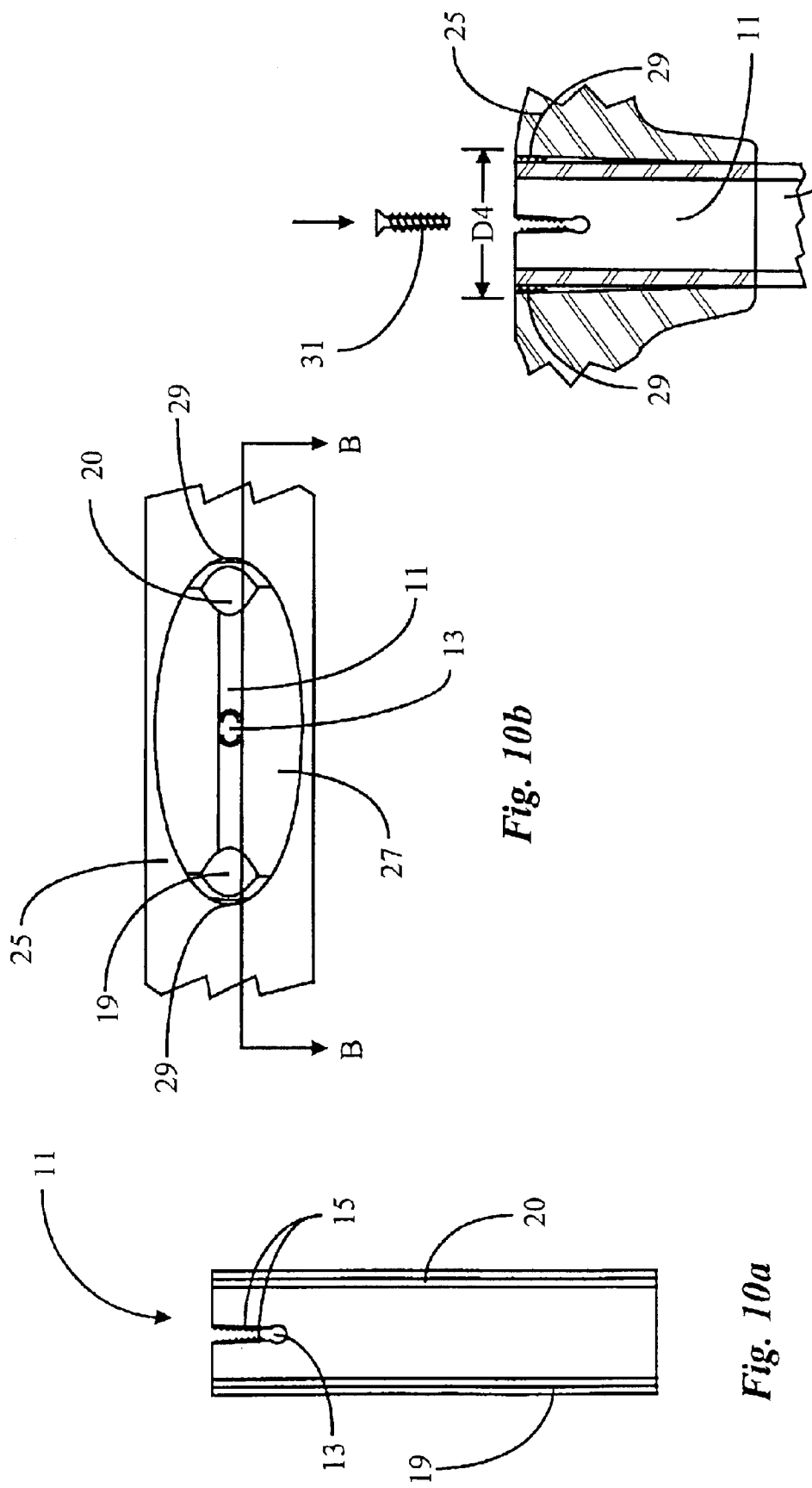

STRONGBACK SYSTEM FOR JOINING A HANDLE TO A HAMMER HEAD

The present application is a divisional application of patent application Ser. No. 09/544,838, filed on Apr. 6, 2000, now U.S. Pat. No. 6,494,119, and which is incorporated herein in its entirety.

FIELD OF THE INVENTION

The present invention is in the area of hand-held striking tools, such as hammers, and pertains more specifically to the interface between head and handle of a striking tool.

BACKGROUND OF THE INVENTION

Hand-held striking tools have been used for centuries by people in a variety of disciplines as leveraged devices to provide a striking force to accomplish a seemingly endless variety of tasks. For example, a claw hammer allows a user doing carpentry work to deliver sufficient striking force to drive a nail into wood. A claw hammer is also used for removing a nail or ripping apart lumber using its claw. A sledge hammer is another common hand-held striking tool used to deliver sufficient striking force for heavy work such as driving a stake, chisel, or driving a wedge into masonry, stone, wood, or other hard materials. Another common hand-held striking tool is a ball peen hammer used to deliver sufficient striking force for shaping and fitting metal, and for driving machine chisels, rivet sets, machine wedges, and other similar tools.

As previously described, hand-held striking tools are commonly used as third class levers to provide a striking force to accomplish tasks such as driving a nail into a piece of wood, bending or forming metal, breaking a rock, and other similar tasks. Third class levers are levers where a fulcrum, also referred to as a pivot point, is at one end of a bar or rod. A load to be overcome is an object creating resistance at the opposite end of a bar or rod. The effort, or force, to be applied to a third class lever is somewhere in between the fulcrum and load. In the case of a hand-held striking tool such as a claw hammer, the fulcrum is a wrist with the force being provided by the deceleration of the movement of a hammer handle (bar or rod) at the wrist. The load in this case is a resistance presented by a piece of wood into which the nail is being driven.

The head of the hand-held striking device is commonly a significant distance from the fulcrum and moves faster than the movement being applied at a user's hand, which is near the fulcrum. The increased speed of the head multiplies the applied force with which a striking device head strikes a nail or digs into the dirt. The longer a claw hammer's handle, for example, the faster the head and the greater the force that strikes a nail and overcomes the resistance of the wood. This principle applies to all other hand held striking devices, and is intensified in long-handled striking devices such as a pickaxe, or an axe.

Hand-held striking tools are also commonly used as first-class levers to provide a lifting or prying force to accomplish a variety of tasks. For example, some hand-held striking devices are used to pull nails out of a piece of wood, tear apart pieces of wood or other building material, pry loose a large rock, lift a log, and the like. First-class levers are levers wherein the load to be overcome is at or near one end of a rod or bar, the effort, or force is applied at or near the other end of the same rod or bar, and the fulcrum, or pivot, is somewhere along the rod or bar in between the applied force and load.

An example of a hand-held striking tool being used as a first-class lever is a claw hammer being used to pull out nails, wherein the load to be overcome is the wood causing friction against an embedded nail. Another example of a hand-held striking tool being used as a first-class lever is a pickaxe being used to pry out a rock or tree root embedded in dirt or rock, where the load to be overcome is the dirt or rock causing friction against an embedded rock or tree root. Whenever a hand-held striking tool is used as a first-class lever, the force is applied at one end of a long handle. The fulcrum is typically near the other end of the handle that holds the head.

The load for a hand-held striking tool being used as a first-class lever, such as in a claw hammer or a pickaxe, is typically very close to the fulcrum. Whereas the force for a hand-held striking tool being used as a third-class lever is typically relatively far away from the fulcrum. During prying or pulling tasks, the load applied is therefore moved less distance than the hand, which is at the opposite end of the lever, and applying the force. This multiplies the force in which the claw hammer head pulls against a nail, or a pickaxe pulls against a rock.

The weakest part of a hand-held striking device is the interface between the handle and the head. The conventional methods of interfacing a striking device head and handle, which are typically made of distinct materials, such as metal and wood, allows striking and pulling stresses to promote head-to-handle loosening, damage, and separation. For example, the impact force at the head of a claw hammer, being used as a third-class lever against a nail, is often as high as 300 pounds. Because of the greater length of its handle and greater weight of its head, the striking force of the head of a pickaxe against the earth is many times greater.

The bending moment applied at the head-to-handle interface of a claw hammer been used as a first-class lever to pull a nail is often as high as 1000 foot-pounds. The bending moment levied against the head-to-handle interface of a pickaxe pulling heavy rocks away from the earth is typically several times more.

The effect of these forces is exacerbated when a user occasionally misses the target for which the strike is intended and strikes a hard object, such as the edge of a piece of wood or a rock, at the head-to-handle interface just below the head, causing further damage and weakening a head-to-handle interface.

Because of the inherent weakness in conventional head-to-handle interfaces, it is this point that most failures in hand-held striking devices occur. Methods have been devised to make head-to-handle interface configurations capable of withstanding impacts and pulling stresses described above without damage. These methods include using a handle made with a material, such as high-impact plastic or heavy-gauge rolled steel that has particularly high strength and resiliency to withstand extremely high impacts and pulling stress. These types of handles are typically encapsulated in a resilient material, such as natural or synthetic rubber, leather, or plastic, to provide some protection from the shock from impact and to give a user a good grip on the handle. Many users of hand-held striking devices, however, still prefer the look and feel of wooden handles.

As stated above, a problem with many conventional methods for increasing handle strength on hand-held striking devices is the inherent weakness in the design of interfaces. Current interfaces for hand-held striking tools typically comprise a handle whose end is shaped to make a tight fit through a shaped opening, or eye, in the head. Such a shaped opening is often tapered to be larger at the end of the opening opposite the side where the handle enters the head. Typically metal or wooden wedges are driven into the end of the handle to expand the handle into the eye of the head to attain a tight fit. A tight fit, however, does little to increase the strength of the conventional head-handle interface.

Another common method for securing conventional head-to-handle interfaces is by placing a bonding material, such as an epoxy adhesive, between the inner surface of the opening in the head and outer surface of the interface and of the handle.

The types of head-to-handle interfaces and methods of securing described above are commonly used on all types of hand-held striking tools, such as axes, sledge hammers, pickaxes, and the like. A problem with these conventional solutions is that the striking and pulling forces are concentrated over a short distance at the interface. The intensified stress at this small area is the cause of most hand-held striking tool failures. Head-to-handle interfaces made according to conventional art, regardless of the material of the handle or method of securing it to the head opening, often fail because of this concentrated stress.

What is clearly needed is an improved method and apparatus for securing the head of a striking tool to its handle, providing both a durable, long-lived head-to-handle interface and an integrated system of overstrike protection to the handle. Such a method and apparatus, in a preferred embodiment, overcomes an inherent weakness in conventional head-to-handle interface methods while preventing damage to the handle caused when a user misses a target and inadvertently strikes the handle against a hard object, damage that causes further weakness in conventional head-to-handle interface methods.

SUMMARY OF THE INVENTION

In a preferred embodiment of the present invention, for a striking tool having a plane of substantial symmetry and a head with an eye for engaging a portion of a handle, a method for securing the handle to the head is provided, comprising the steps of (a) slotting the portion of the handle that extends into the eye of the head in the plane of substantial symmetry, providing a slot with a first width; (b) engaging a metal strongback unit in the slot, the strongback unit having a web with a thickness substantially the width of the slot; (c) engaging the handle and strongback assembly into the eye, and (d) spreading the web of the strongback unit until metal of the strongback unit urges against an inside surface of the head in the eye.

In a preferred embodiment the web has at least one opening at an upper edge for a spreading wedge, and the web is spread in assembly by driving a wedge into the handle and the opening in the web. The strongback unit may also comprise side elements having a second width greater than the web width, such that the side elements lie along opposite sides of the handle with the strongback unit engaged in the handle slot. Spreading the web urges the side elements against the inside surface of the head in the eye. Also in a preferred embodiment the side elements are shaped to fit a curvature of the inside surface of the head in the eye. In some cases the handle is formed on opposite sides of the slotted portion to accommodate the side elements of the strongback unit.

In another preferred embodiment the slot extends further along a length of the handle than the portion of the handle that extends into the eye of the head, and the strongback unit fills the slot, such that the side elements, with the handle and strongback engaged, provide an overstrike surface along a portion of the handle length below the head. In this embodiment as well, the handle may be formed along opposite sides along the slot edges to accommodate the side elements.

In still another preferred embodiment the strongback unit has a first web in an upper portion having a length equal to the handle portion extending into the eye, and a second web in a lower portion, the second web formed at a right angle to the first web, and wherein the handle is slotted with first and second slots at right angles to accommodate both webs. In this embodiment the second web comprises threaded holes, and an overstrike plate is assembled to the handle below the head on the side of the handle toward a striking surface of the head, the overstrike plate secured to the handle by fasteners extending through holes in the plate and the handle, and engaging the threaded holes in the lower web.

In another aspect of the invention a striking tool having a plane of substantial symmetry is provided, comprising a head with an eye for engaging a portion of a handle; a handle with a slot of a first width in the plane of substantial symmetry along a length of the portion of the handle extending into the eye; and a metal strongback unit in the slot, the strongback unit having a web with a thickness substantially the width of the slot. The striking tool is characterized in that the strongback unit is spread in the eye, urging metal of the strongback unit against inside surface of the head in the eye, to secure the head on the handle. In preferred embodiments the web has at least one opening at an upper edge for a spreading wedge, and the web is spread in assembly by driving a wedge into the handle and the opening in the web.

In some embodiments the strongback unit comprises side elements having a second width greater than the web width, such that the side elements lie along opposite sides of the handle with the strongback unit engaged in the handle slot. Spreading the web urges the side elements against the inside surface of the head in the eye. The side elements may be shaped to fit a curvature of the inside surface of the head in the eye. Also, the handle may be formed on opposite sides of the slotted portion to accommodate the side elements of the strongback unit.

In another embodiment the slot extends further along a length of the handle than the portion of the handle that extends into the eye of the head, and the strongback unit fills the slot, such that the side elements, with the handle and strongback engaged, provide an overstrike surface along a portion of the handle length below the head. The handle may be formed along opposite sides along the slot edges to accommodate the side elements.

In yet another preferred embodiment the strongback unit has a first web in an upper portion having a length equal to the handle portion extending into the eye, and a second web in a lower portion, the second web formed at a right angle to the first web, and wherein the handle is slotted with first and second slots at right angles to accommodate both webs. The second web may comprise threaded holes, and an overstrike plate may be assembled to the handle below the head on the side of the handle toward a striking surface of the head, the overstrike plate secured to the handle by fasteners extending through holes in the plate and the handle, and engaging the threaded holes in the lower web.

In various embodiments of the present invention described in enabling detail below, an improved apparatus and method is provided for securing handles to heads of striking tools.

BRIEF DESCRIPTION OF THE DRAWINGS

FIG. 1b is a top view of the strongback of FIG. 1a.

FIG. 2a is a broken view of a conventional hammer head to be used with the strongback of FIG. 1a.

FIG. 3b is a view of the handle section of FIG. 3a, rotated 90 degrees.

FIG. 3c is a top view of the handle section of FIG. 3a.

FIG. 5a is a three-dimensional view of a strongback according to an alternative embodiment of the present invention.

FIG. 5b is a top view of a hammer handle fashioned to be used with the strongback of FIG. 5a.

FIG. 7b is a view at 90 degrees to the view of FIG. 7a.

FIG. 9a is an elevation view of yet another strongback according to an embodiment of the present invention.

FIG. 9b is a top view of a hammer head with the strongback of FIG. 9a used to enhance joining a handle to the head.

FIG. 10a is a side view of still another strongback according to a preferred embodiment of the present invention.

FIG. 10b is a top view showing the strongback of FIG. 10a assembled with a handle into the eye of a hammer head.

FIG. 10c is head, handle, and fastening components in a side view for the embodiment described relative to FIG. 10b.

FIG. 11b is a top view of a handle, head and interface components, illustrating use of the wedge of FIG. 11a.

DESCRIPTION OF THE PREFERRED EMBODIMENTS

Figure 1A:
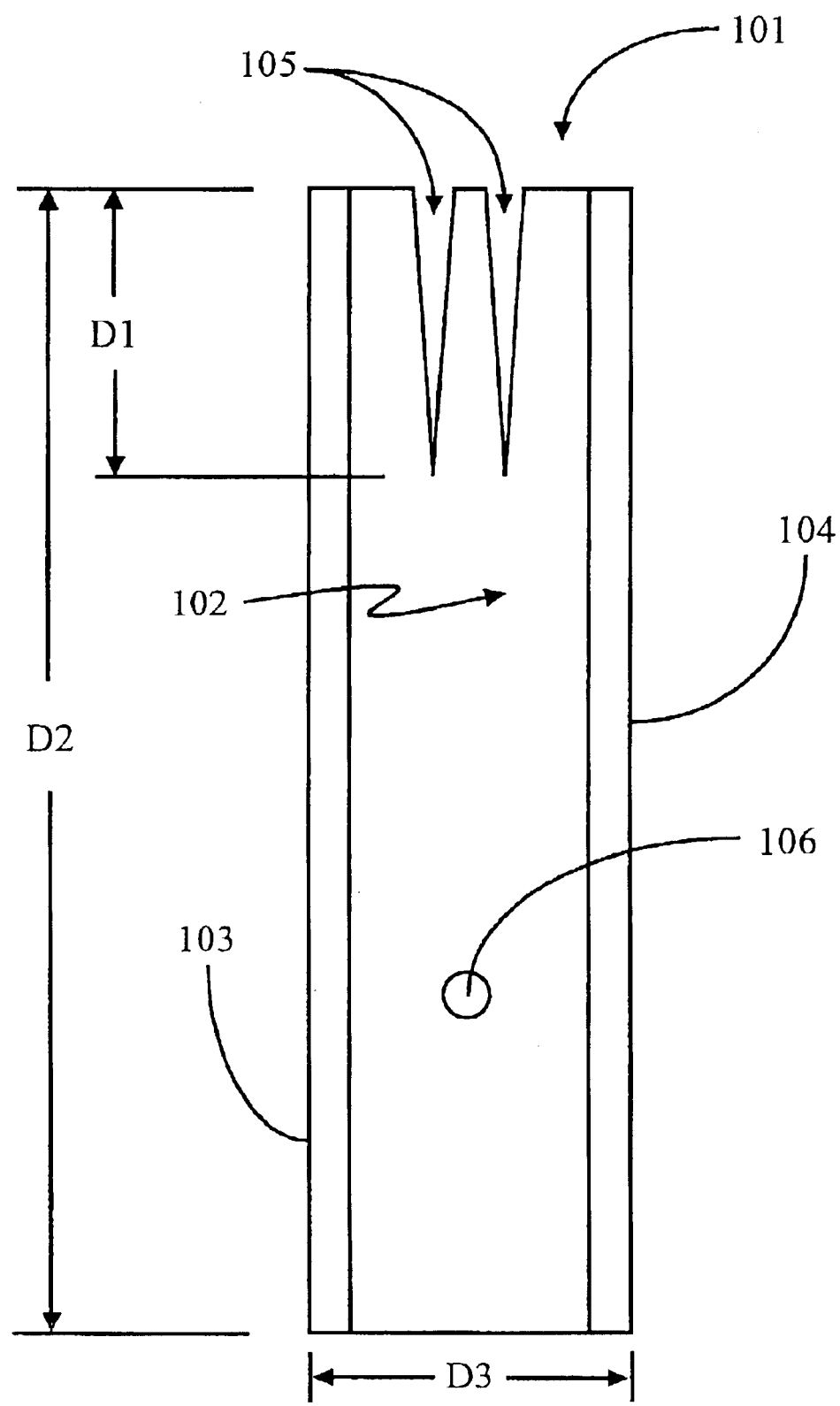
FIG. 1a is a side view of a metal strongback according to embodiment of the present convention.

FIG. 1a is a side view of a metal strongback according to a preferred embodiment of the present convention. Strongback 101 comprises metal having relatively malleable or bendable properties, with a side 103 and side 104 positioned on opposite edges of a web 102, providing a shape similar to a miniature I-beam. Sides 103 and 104 in this embodiment have outer surfaces about half-spherical in shape with inner surfaces being flat. In alternative embodiments however, the shape of outer and inner surfaces can vary greatly. Web 102 is provided having a height D2 being approximately twice or more that of the depth of the eye of a conventional hammer head, and a width D3 approximately equal to that of a conventional hammer handle. Hole 106, passing completely through Strongback 101 is provided as a means to accommodate a standard fastening device such as a threaded bolt set. Slotted openings 105 are provided in this embodiment as V-shaped notches cut, milled or fashioned by some other means to a depth D1 into the top edge of Strongback 101.

Figure 1B:
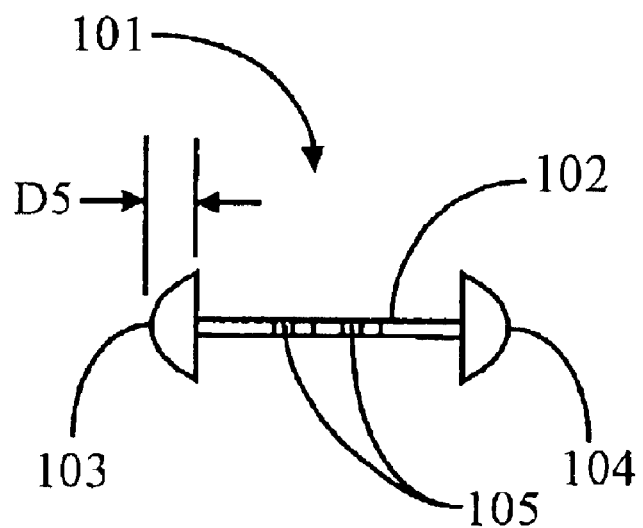

FIG. 1b is a top view of Strongback 101 of FIG. 1a. The half-cylindrical shape of Sides 103 and 104 can be seen in this view, Sides 103 and 104 each having a width of D5. The thickness of Web 102 can also be seen in this view.

Figure 2A:
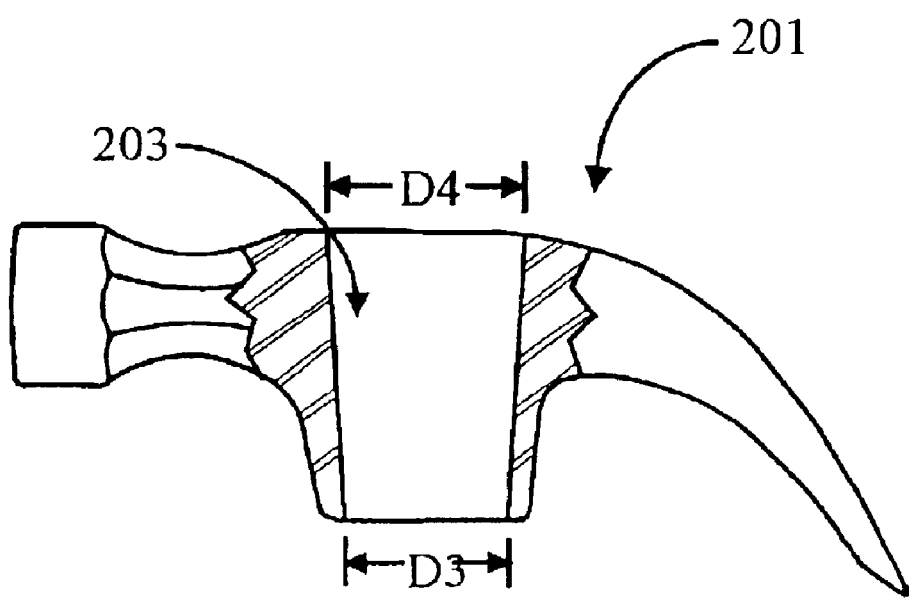

FIG. 2a is a broken view of a conventional hammer head to be used according to an embodiment of the present invention. Hammer head 201 has an eye 203 having a width D3 at the bottom, essentially the same dimension as D3 in FIG. 1a, and a width D4 at the top, width D4 being somewhat larger than width D3. The varying dimensions create an opening somewhat larger in cross-sectional area at the top of Eye 203 than at the bottom, so that, in the process of attachment, when the top end of an inserted hammer handle is spread to dimension D4, the hammer head is held firmly in place.

Figure 3A:
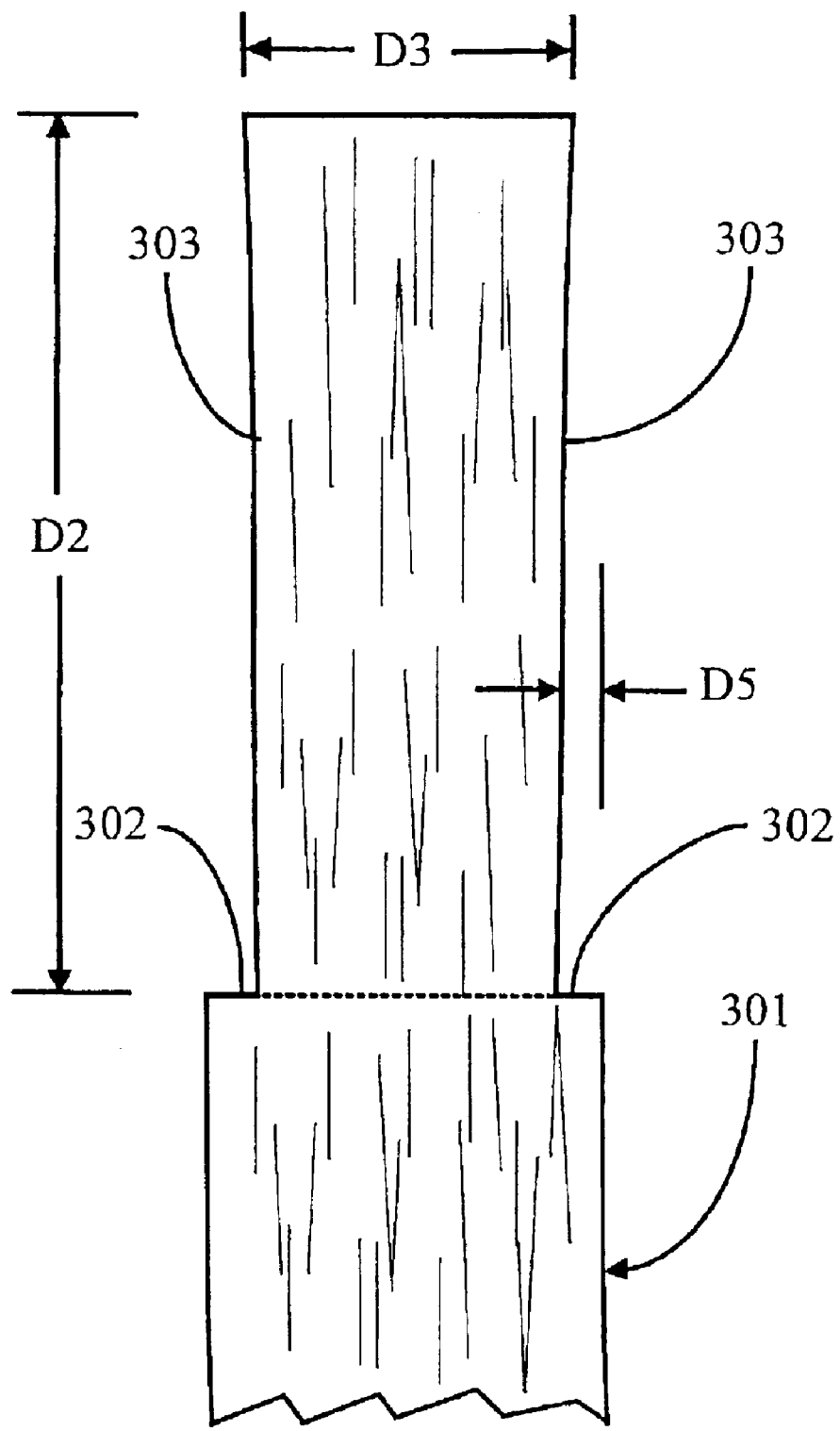
FIG. 3a is a side view of the end of a hammer handle used according to an embodiment of the present invention.

FIG. 3a is a side view of the end of a hammer handle fashioned to join to a head using a strongback according to a preferred embodiment of the present invention. Handle 301 is provided having shoulders 302 milled, cut or fashioned by some other means into each of two Sides 303 to a depth of D5 equal to that of Sides 103 and 104 of Strongback 101 of FIG. 1b. The upper portion of Handle 301 above Shoulders 302 is shaved or milled to a width of D3 and a height of D2, a height equal to that of the overall height of Strongback 101 of FIG. 1a.

FIG. 3b is a side view of the handle section of FIG. 3a. Slot 304 is shown in this view as cut, milled or fashioned by some other means into the center of Handle 301 to a depth of D2 and having a width substantially equal to that of Web 102 of Strongback 101 FIG. 1a.

FIG. 3c is a top view of the handle section of FIG. 3a showing the cutouts of shoulders 302 being of width D5, and slot 304 extending completely through the upper portion of Handle 301. It will be apparent in this view that the overall shape of Strongback 101, as seen in the top view of FIG. 1b, matches exactly the shape created by the fashioning of shoulders 302 and slot 304 into Handle 301, thus allowing for a close fit when Strongback 101 is inserted down into the top of Handle 301.

Figure 4A:
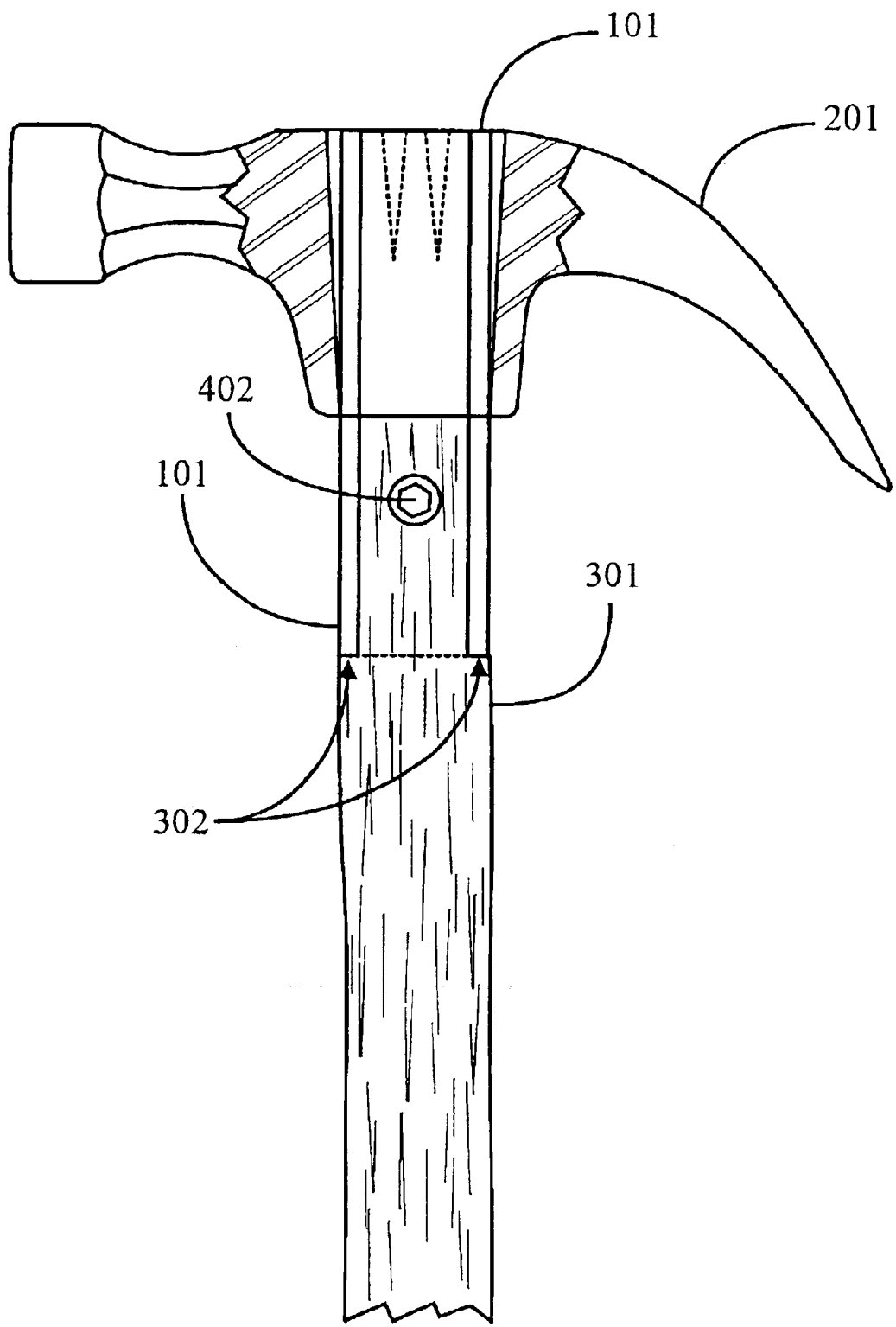
FIG. 4a is a side view of the metal strongback of FIG. 1a, the hammer head of FIG. 2a and the hammer handle of FIG. 3a assembled according to an embodiment of present invention, but not secured.

FIG. 4a is a side view of the metal strongback of FIG. 1a, the hammer head of FIG. 2a and the hammer handle of FIG. 3a assembled according to an embodiment of present invention. The purpose of this view is to show how the components described above are assembled together previous to the final securing of the assembled Handle 301 and Strongback 101 to hammer head 201 according to this embodiment of the present invention. In this view Strongback 101 shown in FIG. 1a is shown inserted down into the slotted top portion of Handle 301, the bottom edge of Strongback 101 seated upon shoulders 302 and the bottom edge of slot 304, and attached using a fastener 402. Fastener 402 in this embodiment is a standard threaded bolt with a hexagonal cap secured by a standard threaded nut at the opposite end. In alternative embodiments however, the type of fastener used in attaching Strongback 101 to Handle 301 can vary. The assembled Strongback 101 and Handle 301 are then inserted up through the eye of hammer head 201 until the top edge of Strongback 101 is flush with the top edge of hammer head 201.

Figures 4B, 4C:
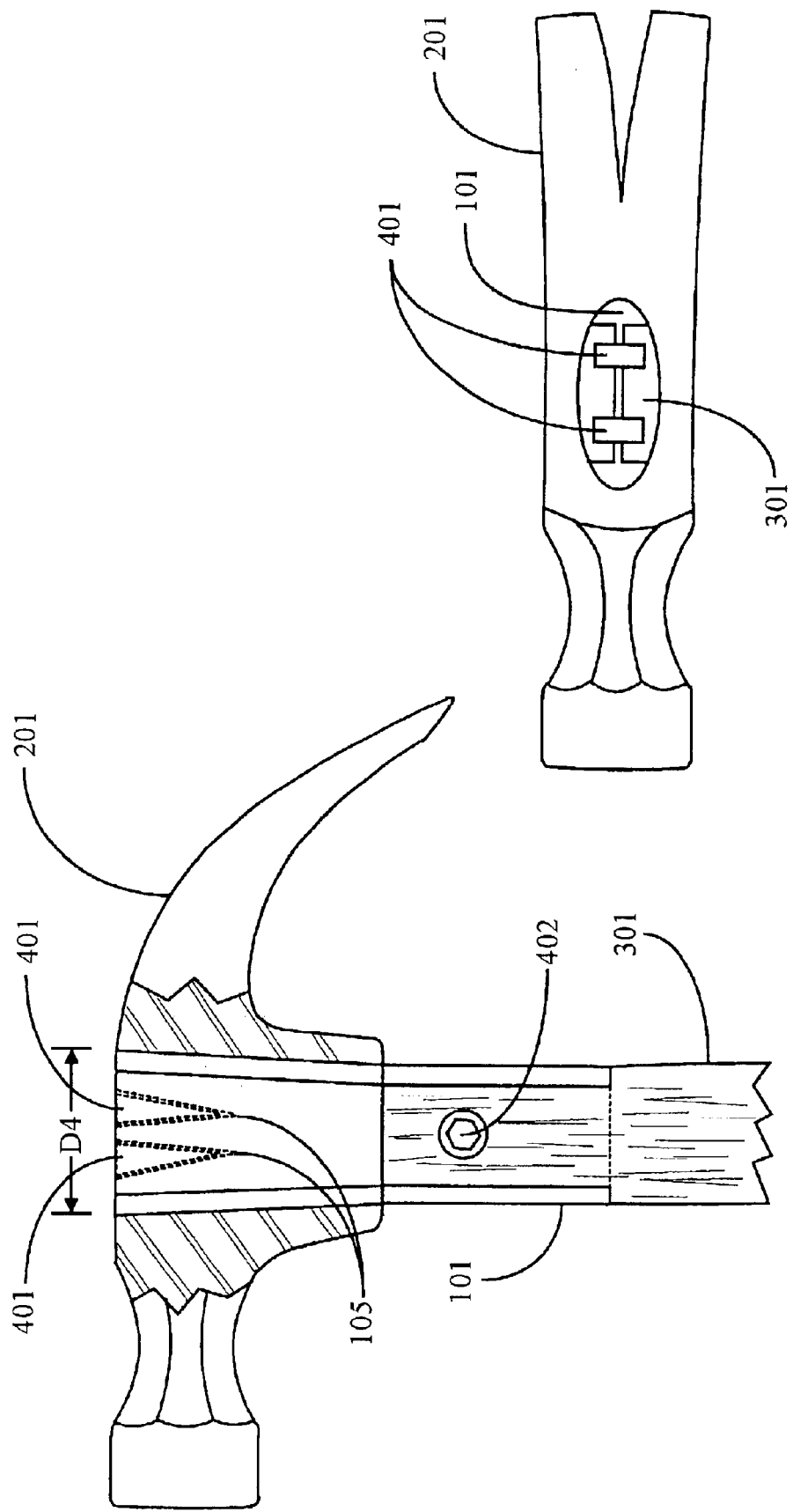
FIG. 4b is a side view of the assembled components of FIG. 4a secured together according to embodiment of the present invention.
FIG. 4c is a top view of the assembled components of FIG. 4b.

FIG. 4b is a side view of the assembled components of FIG. 4a secured together according to embodiment of the present invention. In this view the assembly of the components of FIG. 4a can be seen with the addition of wedges 401 which have been driven down into the open end of the handle and into slotted openings 105. The outward force created by this action causes both the outer sides of the metal Strongback 101, as well as the upper portion of wooden Handle 301 to spread outward to width D4 and urge against the metal inner walls of the eye of hammer head 201 accomplishing metal-to-metal contact. Because height D2 of Strongback 101 is approximately twice that of the height of Hammer head 201, and width D3 is smaller than width D4, the spread upper portions of Sides 103 and 104 of Strongback 101 secure hammer head 201 to the assembled Strongback 101 and handle 301, thus preventing Hammer head 201 from slipping off. The lower portions of metal sides 103 and 104 that now protrude downward from the bottom edge of hammer head 201 along the front and back edges of handle 301 also provide overstrike metal surfaces giving overstrike protection to the upper portion of handle 301. The overstrike surfaces prevent damage to wooden handle 301 in the event of a user missing the target for which the strike of the hammer is intended.

FIG. 5a is a three-dimensional view of a strongback according to an alternative embodiment of the present invention. Strongback 501 is provided having an upper portion 502 similar in shape, function and composition to that of Strongback 101 of FIG. 1a, but with a height equal to that of the eye of a conventional hammer head. Lower portion 503 is a web portion rotated 90 degrees in relation to upper Portion 502. Lower Portion 503 can be fabricated and attached to upper Portion 502 by brazing, welding or by some other means, or as an integral part of Strongback 501, twisted or bent 90 degrees. Threaded Holes 504 are provided in this embodiment as means for an alternate method of attachment to a handle such as Handle 301 of FIG. 4b. In other alternative embodiments the number of Holes 504 can vary, as can the shape, location or size.

FIG. 5b is a top view of a hammer handle fashioned to be used with the strongback of FIG. 5a. Handle 301 is shown in this view to have a slot 304 and shoulders 302 as in FIG. 3c but with a cross slot 505 provided to accommodate lower Portion 503 of Strongback 501 when inserted down into Handle 301. To allow accommodation of Strongback 501, cross slot 505 is cut, milled or otherwise fashioned into Handle 301 to a depth equal to the overall height of Strongback 501 allowing for the complete insertion of Strongback 501 into handle 301.

Figure 5C:
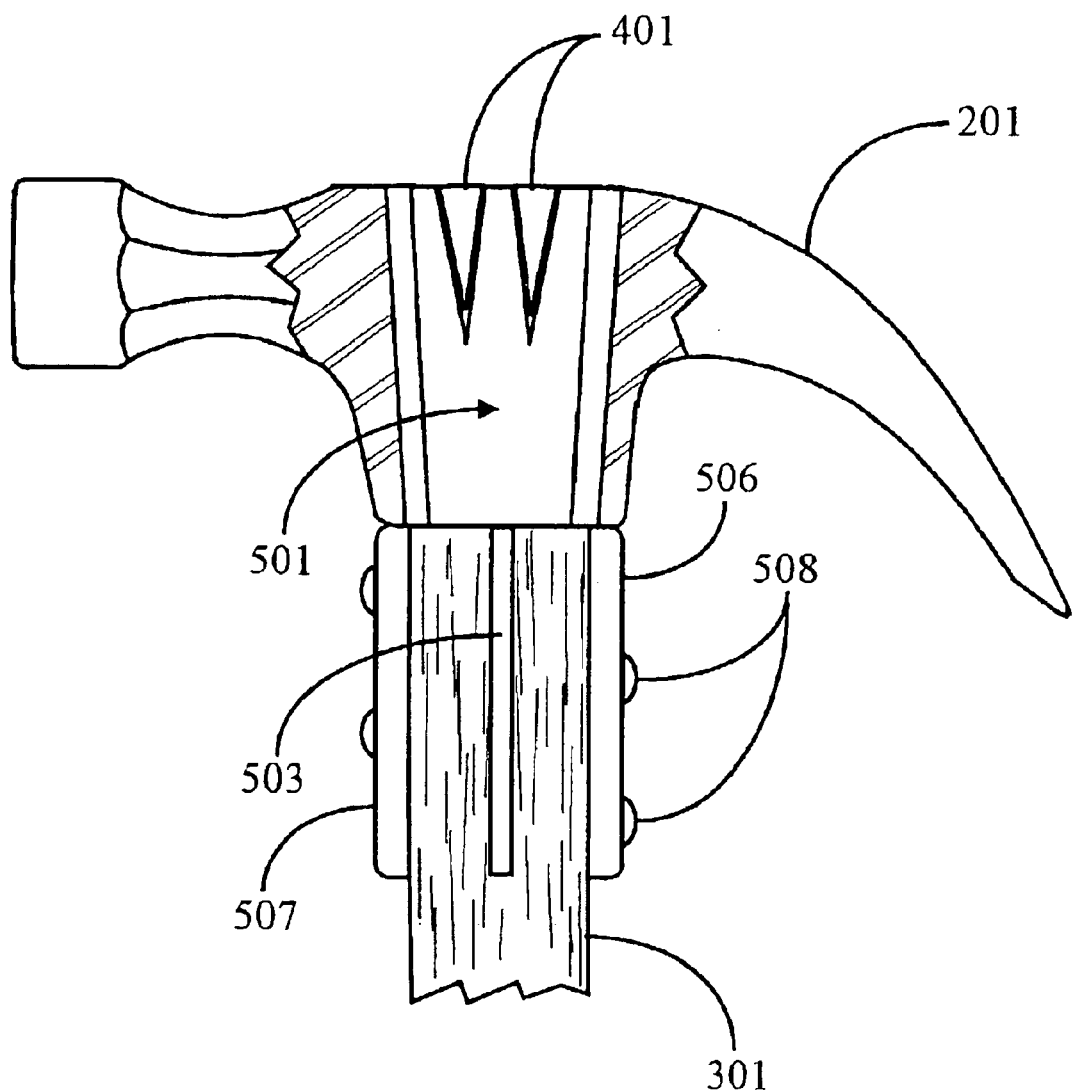
FIG. 5c is a side view of the strongback of FIG. 5a, the hammer handle of FIG. 5b and the hammer head of FIG. 2 assembled according to an alternative embodiment of the present invention.

FIG. 5c is a side view of Strongback 501 of FIG. 5a, Handle 301 of FIG. 5b and hammer head 201 of FIG. 2 assembled together according to an alternative embodiment of the present invention. Wedges 401 are shown forcibly inserted and spreading the sides of Strongback 501 as in FIG. 4b. Metal Caps 506 and 507 are provided in this embodiment to provide protection to handle 301. Although no detail is given in this view, it can be assumed Caps 506 and 507 have holes drilled or bored completely through, as well as holes drilled or bored completely through Handle 301, holes positioned to coincide with the location of holes 504 of Strongback 501, thus allowing accommodation of fasteners 508. Fasteners 508 in this embodiment can be standard threaded bolts inserted through the holes of cap 506 or 507, through the holes of handle 301 and fastened by screwing the threaded end of fastener 508 into a corresponding threaded hole in portion 503 of strongback 501. In alternative embodiments the fasteners used can vary greatly in form or number, as can the location of holes through which they pass and the method of securing the fasteners once inserted.

Figure 6:
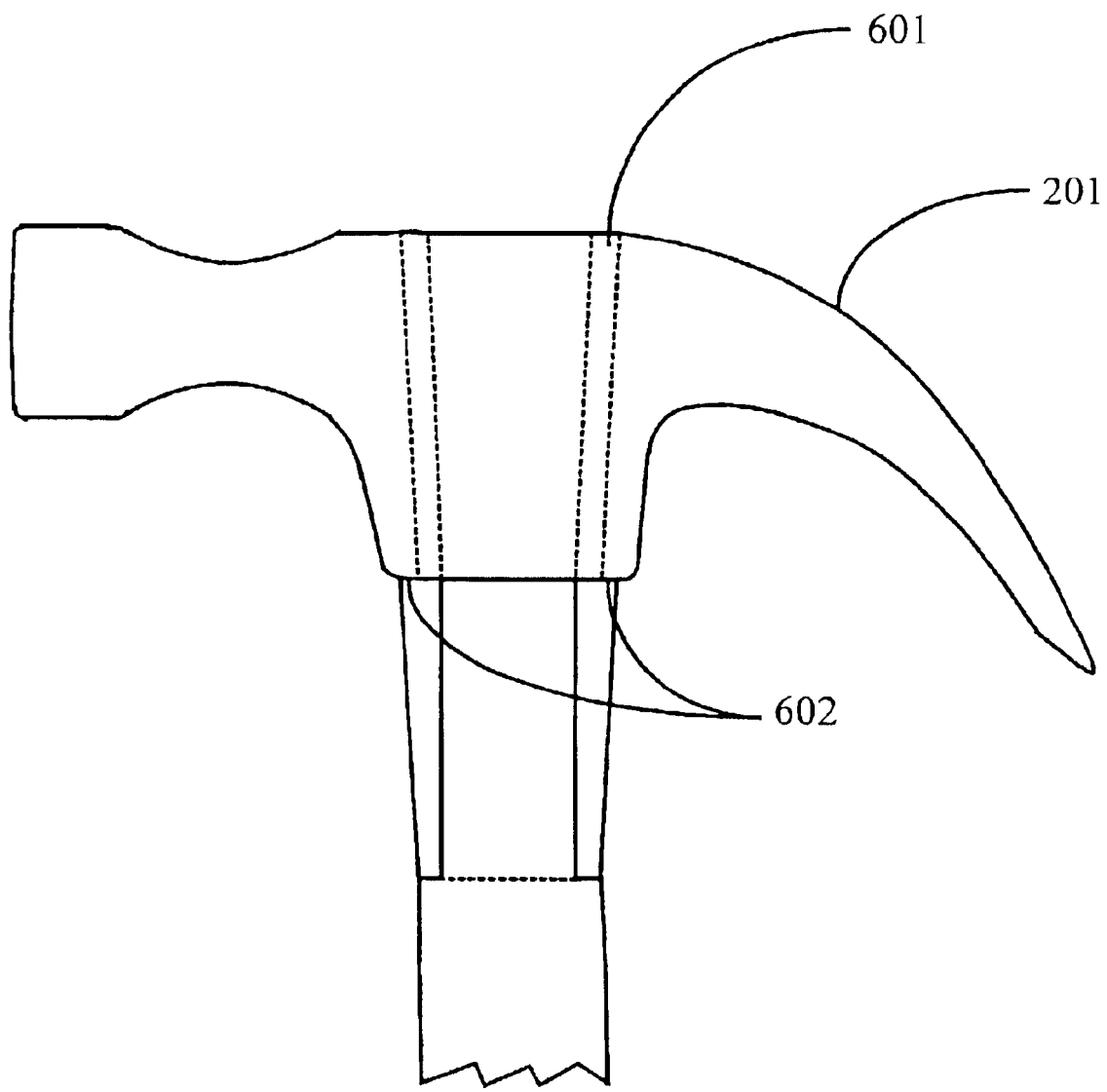
FIG. 6 is a simplified view of a metal strongback according to another alternative embodiment of the present invention assembled with a conventional hammer head.

FIG. 6 is a simplified view of a metal strongback according to another alternative embodiment of the present invention assembled with a conventional hammer head. Many details have been omitted from this view in order to provide a clearer view of the subject matter of this embodiment. Strongback 601 is provided being similar in size and shape to Strongback 101 of FIG. 1a, but with the addition of Shoulders 602 located on opposite ends to provide an interface with, and support to the bottom edge of a conventional hammer head as shown. In another alternative embodiment a strongback similar to that of FIG. 1a but with a shorter height that is equal to that of the eye of a Hammer head 201 may be used. In this embodiment, because of the shorter height, overstrike protection is not provided nor is a hole such as hole 106, or a fastener such as Fastener 402. The method of securing a hammer head to a handle in this embodiment is accomplished solely by the insertion of wedges as in FIG. 4b, thereby spreading the top portion of metal Strongback 601 against the metal surface of the eye of a hammer head similarly to methods previously described.

Figure 7B:
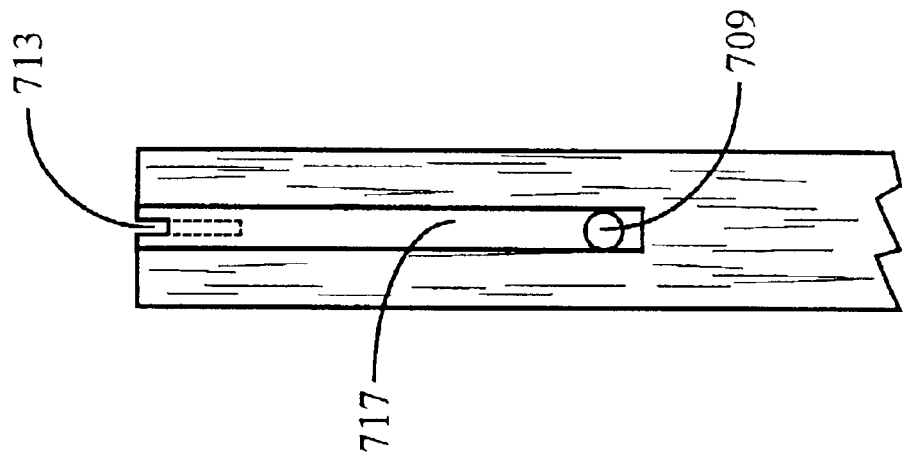
Figure 7A:
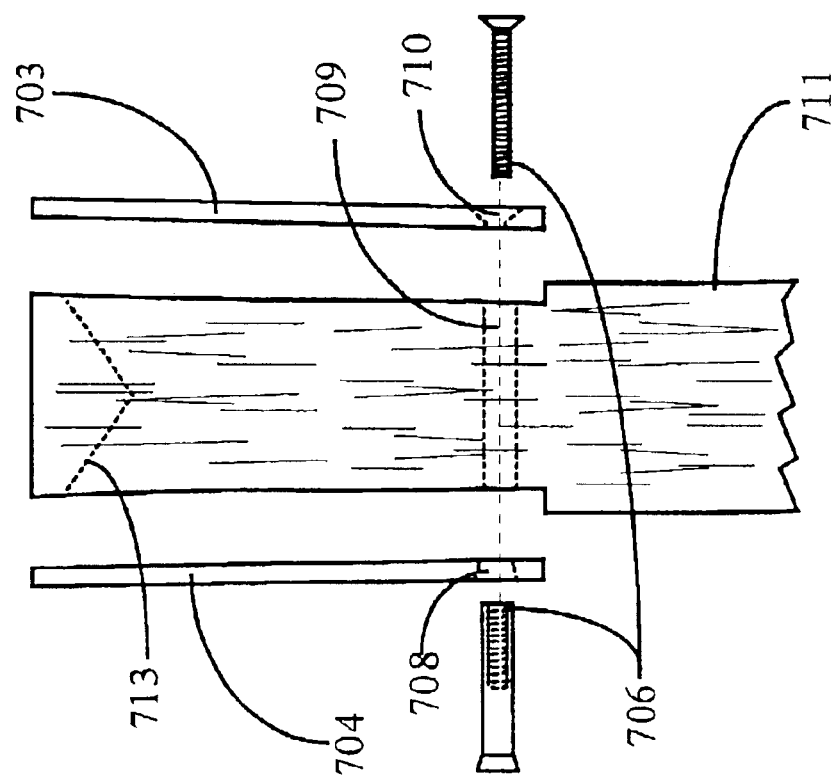
FIG. 7a is side view of a hammer handle and fastening elements according to an alternative embodiment of the present invention.

FIG. 7a is a broken side view of a strongback system with hammer handle according to another alternative embodiment of the present invention. Metal Plates 703 and 704 are provided in this embodiment being equal to each other in size and shape, and having Holes 708 and 710 passing completely through the bottom portion, holes through which a fastener such as Fastener 706 can pass. Fastener 706 in this embodiment is a standard 2-piece assembly comprising of a threaded bolt as a first piece that is inserted and screwed into the female threaded hole of a cylindrically shaped second piece at the opposite end of the assembly. The type of fastener used however can vary greatly in other alternative embodiments. For example, a standard nut and bolt commonly known in the art could be used, as could a screw or some other similar fastening device.

Hammer Handle 711 is provided in this embodiment as similar in outward shape and appearance to that of Handle 301 of FIG. 3a, but with some distinct differences. Handle 711 has a Hole 709 passing completely through Handle 711 and having a diameter sufficient to accommodate a fastener such as Fastener 706. Hole 709 can also have varying diameters and other properties to accommodate different types of fasteners in other alternative embodiments of the present invention. A V-shaped Slot 713 can be seen in this view cut into the upper portion of Handle 711. The purpose of Slot 713 in this embodiment is to accommodate a securing wedge used when attaching a hammerhead, and is described and depicted below in greater detail.

FIG. 7b is a broken front view of the hammer handle of FIG. 7a. In this view the width and orientation of notch 713 can be seen more clearly, as can the centered location of Hole 709. Surface 717 is provided having a surface area roughly equal to the dimensions of the bottom surface of Plate 703 so as to provide an even and flat surface on which Plate 703 will rest when secured. Although it is not shown in this view a surface identical to Surface 717 is provided at the opposite side of Handle 711 to accommodate the placement and securing of Plate 704.

Figure 7C:
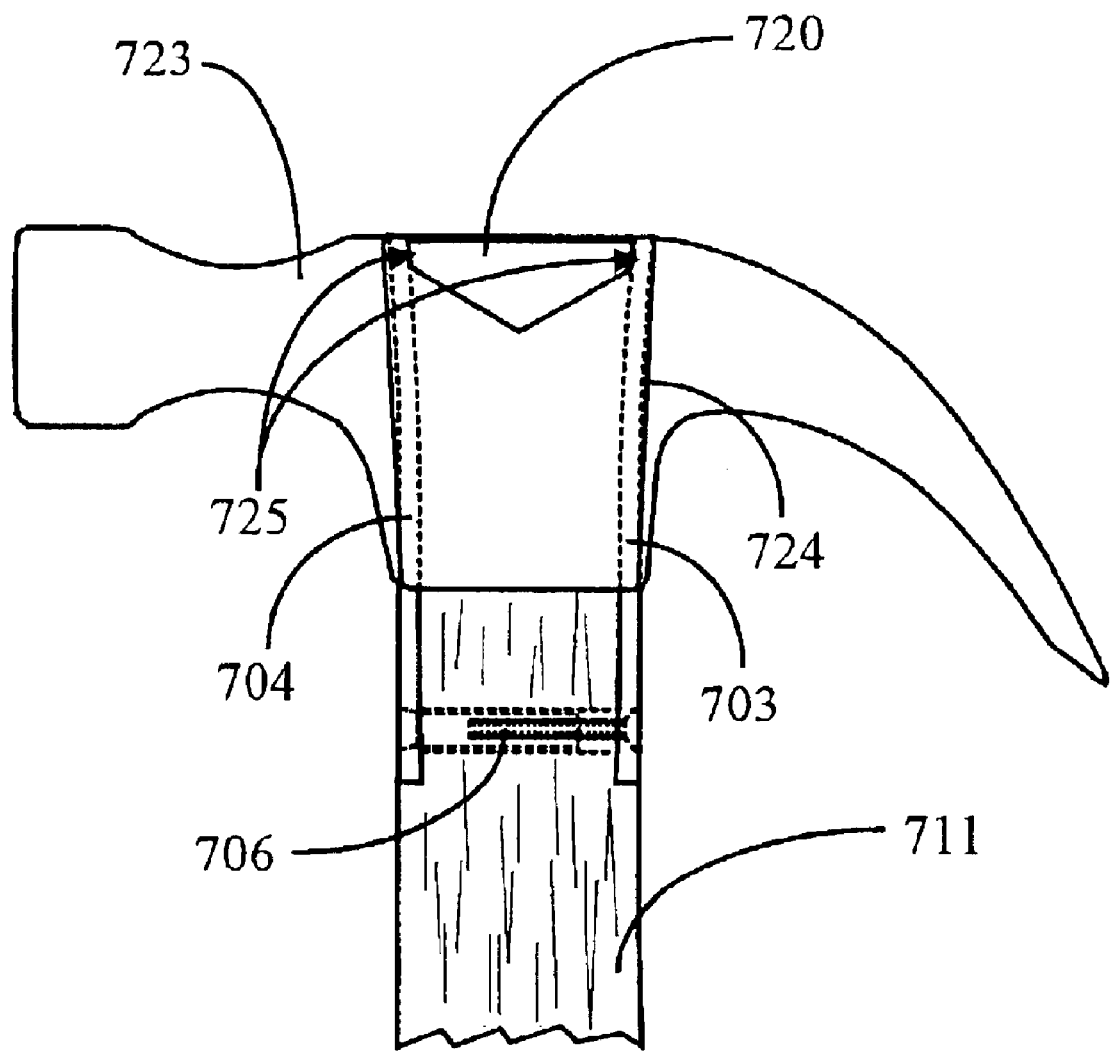
FIG. 7c is an assembly view showing a hammer head assembled to a hammer using the elements of FIGS. 7a and 7b.

FIG. 7c is a broken side view of the components of FIG. 7a secured to a conventional hammerhead according to an embodiment of the present invention. Plates 703 and 704 attach to Handle 711 using Fastener 706 inserted through holes previously described. The assembly described above is then inserted up through the eye opening of a conventional hammerhead such as Hammerhead 723 as shown. Wedge 720 is provided in this embodiment to complete securing the assembled components described above. Wedge 720 is urged down into Slot 713 until fully seated and the top edge of Wedge 720 is flush with the top edges of the assembled handle 711 and hammerhead 723. The shape and diameter of wedge 720, being similar to that of Slot 713 provides a snug fit once inserted. As Wedge 720 is driven down into Notch 715, the angled sides of Wedge 720, wider at the top edge than at the bottom edge, make contact with the inner edges of Plates 703 and 704 driving them in an outward direction causing the outer edges of Plates 703 and 704 to urge against the inner walls of the eye of hammerhead 723, thereby securing hammerhead 723 to the remaining assembled components. In some embodiments spot-welds may be used at points 725 to secure each end of fully inserted wedge 720 to the inner edges of plates 703 and 704, plates 703 and 704 being held in the forced outward position.

Figure 8A:
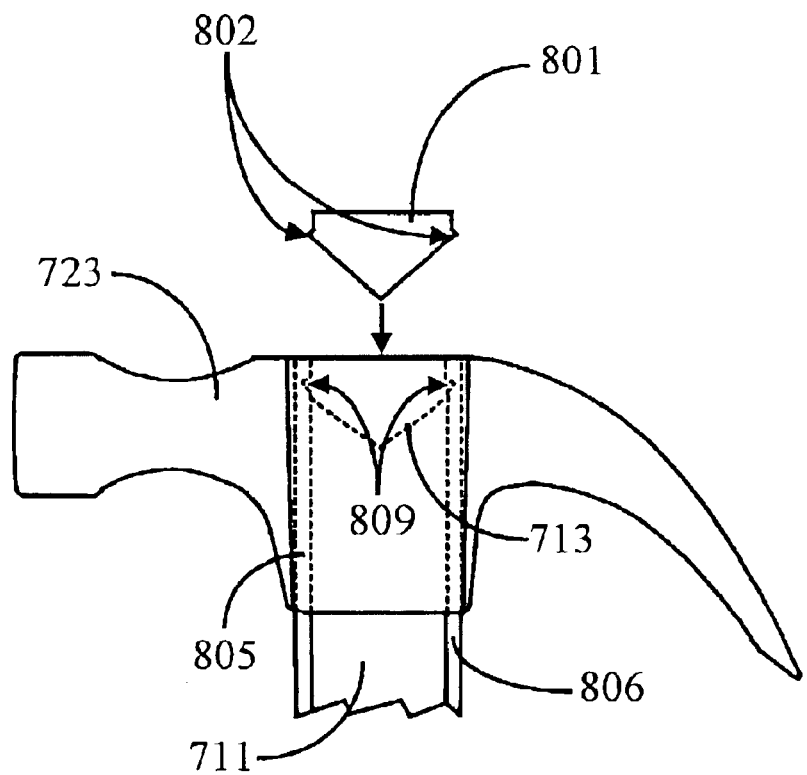
FIG. 8a is a side view showing an apparatus in an alternative embodiment of the present invention.

FIG. 8a is a broken side view of a hammerhead and handle as used with a strongback and securing wedge according to another alternative embodiment of the present invention. In this simplified view metal plates 805 and 806 are provided being similar in size and positioned according to the embodiment represented in FIG. 7c, but having notches 809 cut, forged or fashioned by some other means into the inner sides near the top of each plate. Metal plates 805 and 806 are fastened to Handle 711 and the assembly is then inserted up into hammerhead 723, similarly to the components of FIG. 7c, until flush with the top edge of hammerhead 723. Wedge 801 is provided in this alternative embodiment being similar in size in shape to Wedge 720 of FIG. 7c but with protrusions 802 positioned on each opposite end of wedge 801 and having outer dimensions similar to the inner dimensions of notches 809 of plates 805 and 806.

Once the assembled handle 711 and Plates 805 and 806 are fully inserted up into hammerhead 723, wedge 801 is inserted down, in the direction shown, into slot 713 until fully seated, similarly to wedge 720 of FIG. 7c. During downward insertion of wedge 801 the inner edges of plates 805 and 806 are urged outward by the force of the angled sides of wedge 801, urging the outer edges of plates 805 and 806 against the inner walls of hammerhead 723 as in FIG. 7c.

Figure 8B:
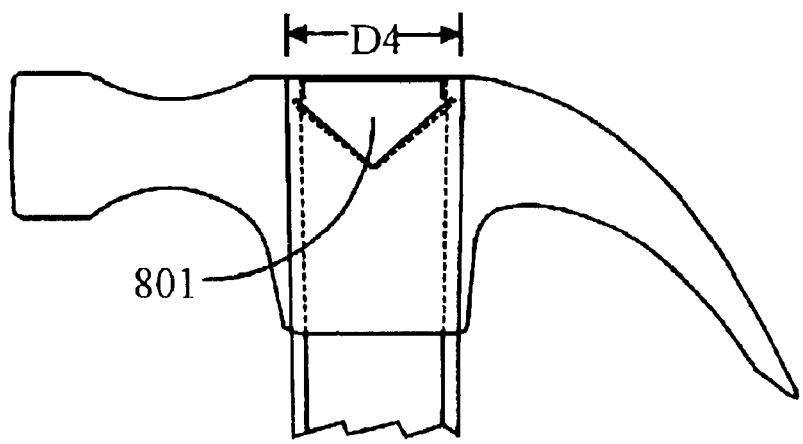
FIG. 8b is a side view of the apparatus of FIG. 8a showing the assembly completed.

FIG. 8b is a broken side view of the components of FIG. 8a assembled according to an embodiment of the present invention. Wedge 801 is shown in this view fully inserted into slot 713. Once wedge 801 is fully inserted, protrusions 802 fill the void created by notches 809 and snap securely into place by the resilient tendency of plates 805 and 806 to remain in the unforced inward position. With wedge 801 in the locked position, the outer edges of plates 805 and 806 are forced against the inner walls of hammerhead 723 thereby securing the components together as in FIG. 7c, but also allowing a user to remove or replace wedge 801 if required.

FIG. 9a is a side view of a strongback according to another alternative embodiment of the present invention.

Strongback 901 is provided in this embodiment being somewhat similar in size and shape to Strongback 101 of FIG. 1a but having several distinct differences. A singular notch 903 is provided in this embodiment to accommodate the insertion of a securing wedge shown later in greater detail. Notch 903 also has a vertical dimension similar to that of dimension D1 of FIG. 1a, but has a shape more rectangular in nature. An enlarged circular opening is positioned at the bottom of notch 903 allowing for easier insertion and less resistance when a securing wedge is inserted. Sides 905 and 906 are provided in this embodiment being positioned on the outer edges of strongback 901 but having curved inner edges instead of the flat inner edges of strongback 101, thereby increasing the strength of the interface between the web and sides when the outward forces are created by the insertion of a securing wedge. Serrations 908 are cut, welded or fashioned by some other means into the top outer edges of sides 905 and 906 providing an improved hold on the inner walls of the eye of a hammerhead once a wedge is inserted. Hole 909, similar in size and position to hole 106 of FIG. 1a, is provided in this embodiment to allow for the use of a fastening device.

FIG. 9b is a broken top view of the strongback of FIG. 9a, assembled with a hammerhead and handle according to an embodiment of the present invention. This view shows strongback 901 assembled with a handle 914 and a hammerhead 723 prior to insertion of a wedge. Handle 914 is provided in this embodiment with a slot 916 cut across the center into the top to a depth approximately equal to that of dimension D1 of FIG. 1a. This dimension however, can vary in different embodiments. The purpose of slot 916 is to accommodate a securing wedge similar to previously described. The rounded shape of sides 905 and 906 can be clearly seen in this view.

Figure 9C:
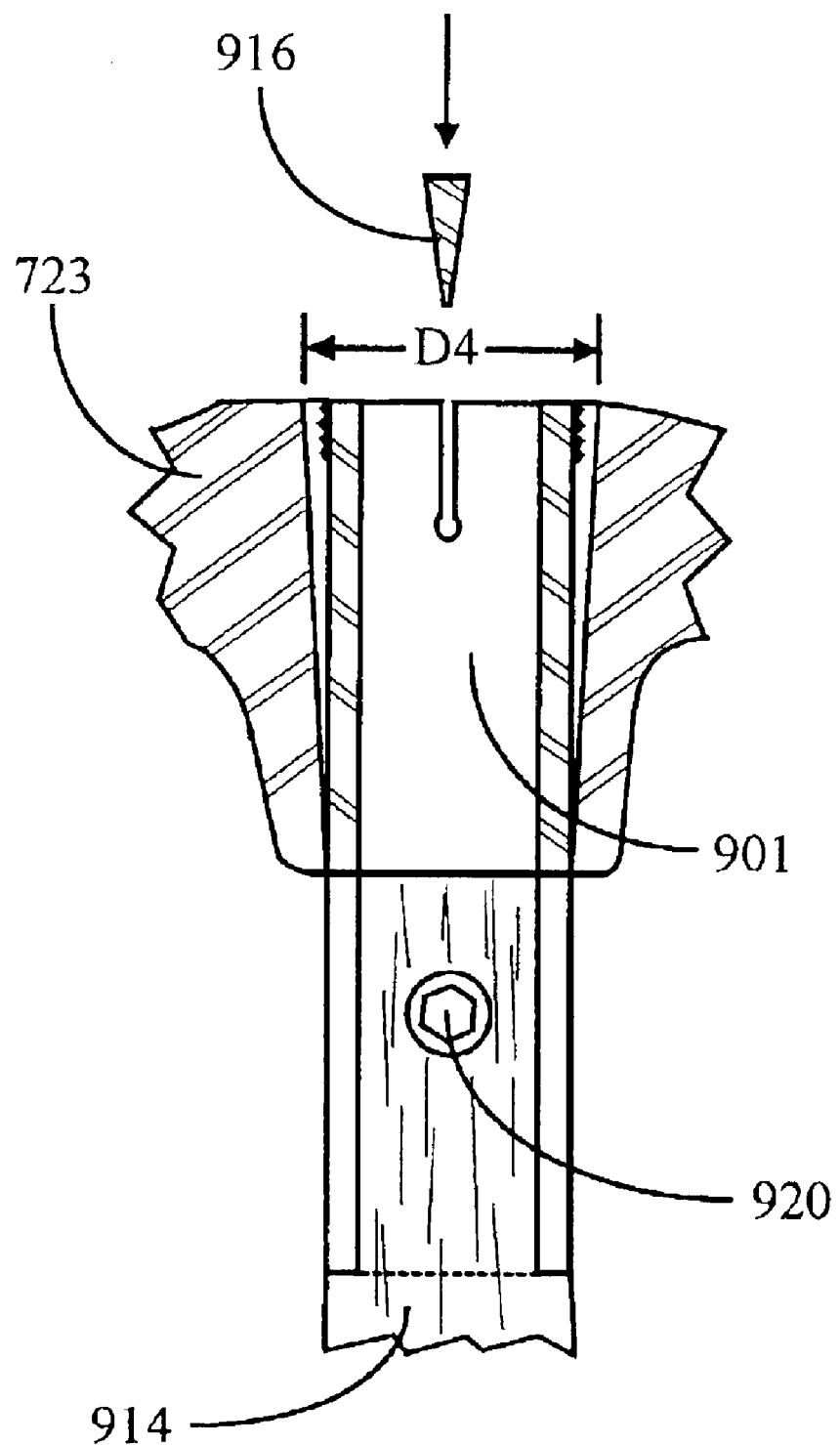
FIG. 9c is a side elevation view illustrating the head and handle from FIG. 9b in assembly.

FIG. 9c is a broken section view of the assembled components of FIG. 9b with a securing wedge and fastener according to an embodiment of the present invention. A section view taken along line A—A of FIG. 9b shows greater detail of the components as assembled according to this embodiment. Wedge 918 is provided that, when driven down in the direction indicated into Slot 903, creates an outward force causing the sides of strongback 901 to urge against the inner walls of the eye of hammerhead 723, thereby securing the components together similarly to methods previously described, with serrations 908 enhancing the grip. In some embodiments matching serrations may be provided on the inner surface oft the eye of the hammerhead. Fastener 920 in this embodiment is a standard nut and bolt but can vary greatly in other alternative embodiments.

FIG. 10a is a side view of a strongback according to another alternative embodiment of the present invention. Strongback 11 is provided in this embodiment being somewhat similar in size and shape to strongback 901 of FIG. 10a but having a singular notch 13 creating a void having a rounded shape. The inner walls of the rounded void are threaded to accept a screw-type wedge that is described below in greater detail. Strongback 11 has sides 19 and 20 being similar in size, shape and location to those of strongback 901 but without serrations at the top of the outer edges.

FIG. 10b is a broken top view of the strongback of FIG. 10a, assembled with a hammerhead and handle according to an embodiment of the present invention. In this simplified view strongback 11 is shown assembled with a handle 27 and a hammerhead 25 prior to the insertion of a wedge. Although not shown in this view, handle 27 is provided in this embodiment having a slot similar to Slot 304 of handle 301 of FIG. 3b, extending down into handle 27 to a depth equal to the length of strongback 11. Hammerhead 25 is provided having serrations 29 at both opposite ends of the eye of hammerhead 25 positioned near the top edge. The purpose of serrations 29 is to provide an improved grip between the outer edges of Sides 19 and 20 and the inner walls of the eye of hammerhead 25 once Sides 19 and 20 have been spread outward by the insertion of a wedge. The rounded void created by notch 13 can be seen in this view, as can the shape of sides 19 and 20.

FIG. 10c is a broken section view of the components of FIG. 10b used with a wedge-screw according to an embodiment of the present invention. A section view taken along line B—B of FIG. 10b shows greater detail of the components as assembled according to this embodiment. Screw wedge 31 is provided being similar in form to a standard threaded screw and having a diameter slightly larger than that of the rounded void created by notch 13. Screw wedge 31 is inserted down in the direction indicated into the rounded, threaded void of slot 13. When screw wedge 31 is screwed down into threaded notch 13 an outward force is created causing the sides of strongback 11 to urge outward to dimension D4 against the inner walls of the eye of hammerhead 25, thereby securing the components together similarly to methods previously described, with serrations 29 enhancing the grip. Although not shown in this view, strongback 11 can be secured to handle 27 using various fasteners such as previously described.

Figure 11B:
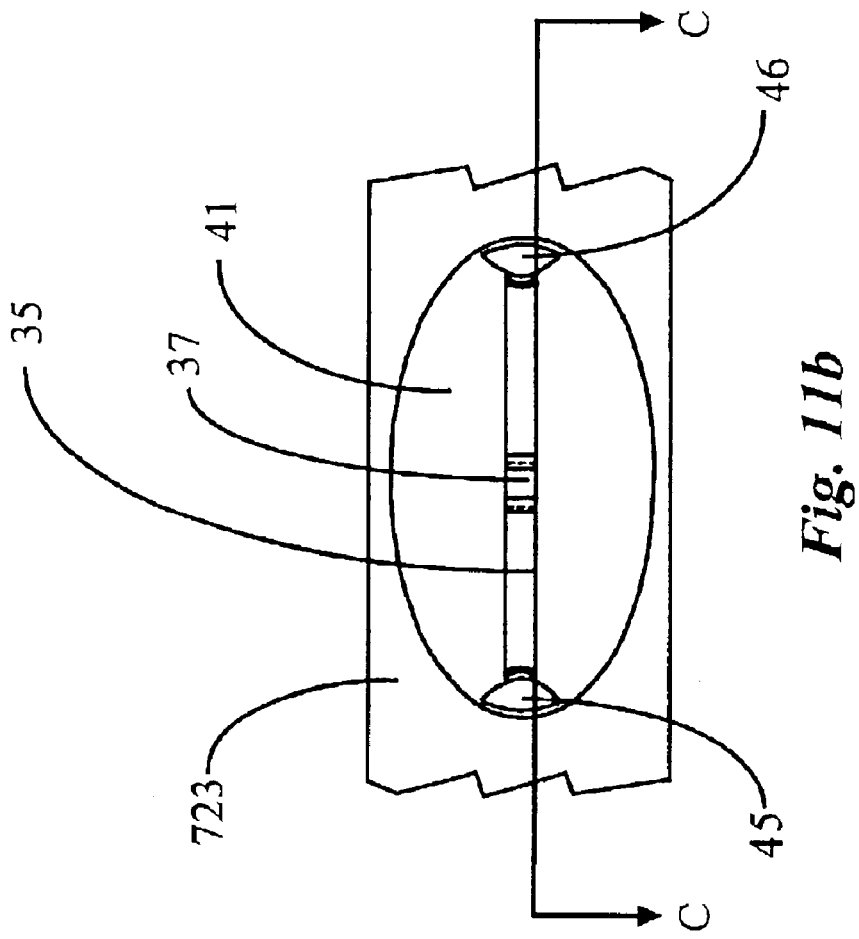
Figure 11A:
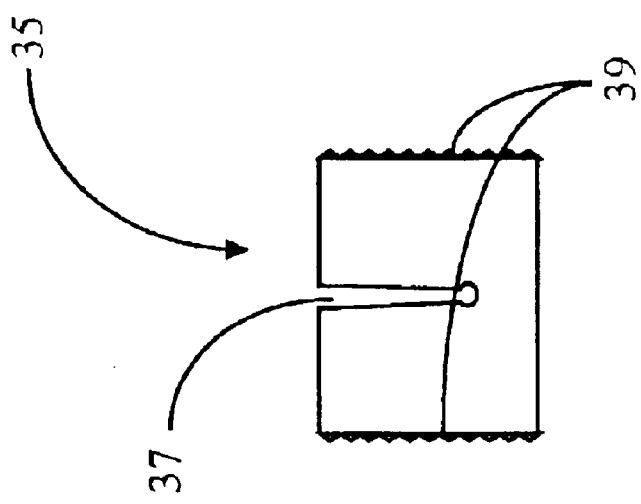
FIG. 11a is a side view of a special wedge used in an embodiment of the present invention.

FIG. 11a is a side view of a securing wedge according to another alternative embodiment of the present convention. Wedge 35 is provided having a notch 37 similar in size and shape to n903 of strongback 901 of FIG. 9a. Serrations 39, provided as a means for improving the grip between the assembled and secured components, are positioned at both opposite edges of wedge 35.

FIG. 11b is a broken top view of the securing wedge of FIG. 11a, assembled with a hammer handle, head and strongback system according to an embodiment of the present invention. In this simplified view wedge 35 is shown assembled with a handle 41 and a hammerhead 723 prior to the insertion of a wedge. Although not shown in this view, handle 41 has a slot extending down into handle 41 to a depth equal to the vertical height of wedge 35. Metal plates 45 and 46 are provided in this embodiment being similar in size and shape to plates 703 and 704 of FIG. 7a and are assembled with handle 41 similarly.

Figure 11C:
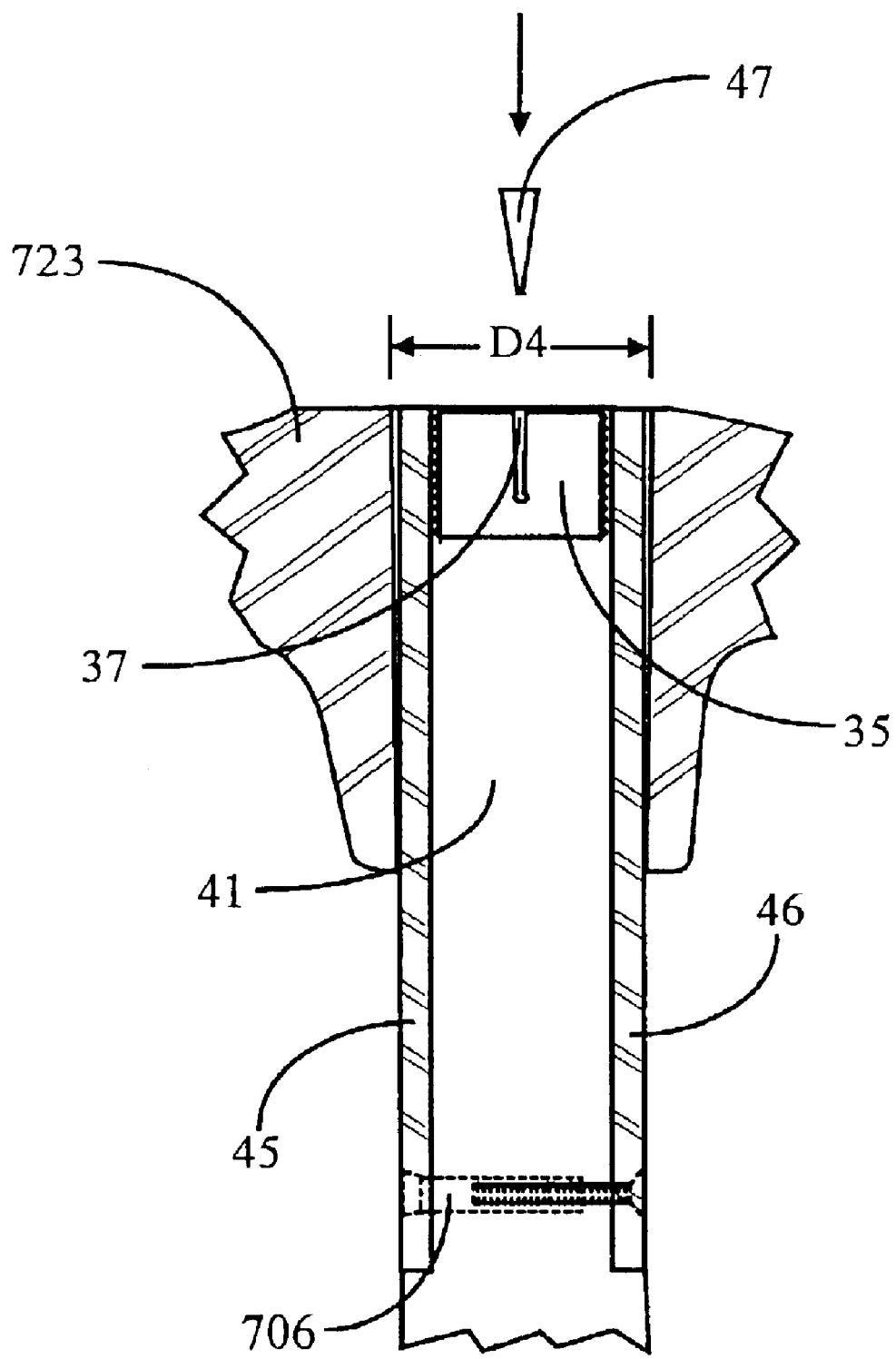
FIG. 11c is an assembly view illustrating assembly of the components from FIGS. 11a and 11b.

FIG. 11c is a broken section view of the assembled components of FIG. 11b with a securing wedge and fastener according to an embodiment of the present invention. A section view taken along line C—C of FIG. 11b shows greater detail of the components as assembled according to this embodiment. Wedge 47 is provided being similar in size and shape to wedge 918 of FIG. 9c, having a width slightly greater than the opening of notch 37. Wedge 47 is inserted down in the direction indicated into notch 37 of wedge 35, spreading this serrated sides outward to dimension D4, thereby securing the components together similarly to methods previously described, with serrations 39 enhancing the grip. In this embodiment plates 45 and 46 are secured to handle 41 using a fastener 706 previously described, but the type of fastener used can vary greatly in other alternative environments.

It will be apparent to a worker of ordinary skill that there are many alterations that may be made in the embodiments described herein without departing from the overall spirit and scope of the present invention. For these reasons the invention should be afforded the broadest possible scope limited only by the claims that follow.

What is claimed is:

1. For a striking tool having a plane of substantial symmetry and a head with an eye for engaging a portion of a handle, a method for securing the handle to the head, comprising the steps of:

(a) slotting the portion of the handle that extends into the eye of the head in the plane of substantial symmetry, providing a slot with a first width;

(b) engaging a metal strongback unit in the slot, the strongback unit having a web with a thickness substantially the width of the slot;

(c) engaging the handle and strongback assembly into the eye, and (d) spreading the web of the strongback unit until metal of the strongback unit urges against an inside surface of the head in the eye.

2. The method of claim 1, wherein the web has at least one opening at an upper edge for a spreading wedge, and the web is spread in assembly by driving a wedge into the handle and the opening in the web.

3. The method of claim 1 wherein, in step (b), the strongback unit comprises side elements having a second width greater than the web width, such that the side elements lie along opposite sides of the handle with the strongback unit engaged in the handle slot.

4. The method of claim 3 wherein, in step (d), spreading the web urges the side elements against the inside surface of the head in the eye.

5. The method of claim 3 wherein the side elements are shaped to fit a curvature of the inside surface of the head in the eye.

6. The method of claim 3 wherein the handle is formed on opposite sides of the slotted portion to accommodate the side elements of the strongback unit.

7. The method of claim 3 wherein the slot extends further along a length of the handle than the portion of the handle that extends into the eye of the head, and the strongback unit fills the slot, such that the side elements, with the handle and strongback engaged, provide an overstrike surface along a portion of the handle length below the head.

8. The method of claim 7 wherein the handle is formed along opposite sides along the slot edges to accommodate the side elements.

9. The method of claim 1 wherein the strongback unit has a first web in an upper portion having a length equal to the handle portion extending into the eye, and a second web in a lower portion, the second web formed at a right angle to the first web, and wherein the handle is slotted with first and second slots at right angles to accommodate both webs.

10. The method of claim 9 wherein the second web comprises threaded holes, and an overstrike plate is assembled to the handle below the head on the side of the handle toward a striking surface of the head, the overstrike plate secured to the handle by fasteners extending through holes in the plate and the handle, and engaging the threaded holes in the lower web.

* * * * *